United States Patent Office.

BENJAMIN D. STEVENS, OF PRAIRIE DU CHIEN, WISCONSIN, ASSIGNOR TO HIMSELF, NATHAN A. WRIGHT, AND JOHN CONANT, OF SAME PLACE.

Letters Patent No. 114,218, dated April 25, 1871.

IMPROVEMENT IN RUBBER VENEERS.

The Schedule referred to in these Letters Patent and making part of the same.

*To all whom it may concern:*

Be it known that I, BENJAMIN D. STEVENS, D.D.S., of Prairie du Chien, in the county of Crawford and State of Wisconsin, have invented a new and useful Improvement in Gum Veneers; and I do hereby declare the following to be a full and correct description of the same.

The nature of this invention consists in the production of a veneer by the application of India rubber or gutta-percha in a plastic state to one side of cloth or any equivalent flexible material, and subsequently vulcanizing the gum.

The veneer thus produced is to be used for the ordinary purposes of common veneers, such as the covering of the surfaces of the articles of furniture, being attached to them by glue or any proper cement.

I am aware that rubber and gutta-percha have been applied in a plastic state to the surfaces of articles of wood, metal, &c., and afterward vulcanized, the application and vulcanization being made in molds or otherwise; but, so far as I am able to learn, the manufacture of a separate veneer, by spreading gum upon the surface of cloth and afterward vulcanizing it, before the application of the veneer to the article it is intended to cover, has not before been attempted.

It is obvious that such veneers, colored to imitate woods, or in any other desired manner, would be applicable to a multitude of purposes for which plastic rubber which required to be vulcanized subsequently to its application would not be available. I propose to make my gum veneers a distinct article of manufacture and commerce, and contemplate their application upon the largest articles of furniture, and upon the external surfaces of railroad cars and other vehicles, and for a great number of other useful purposes.

I do not claim coating the surfaces of articles with rubber; but

What I do claim, and desire to secure by Letters Patent, is—

A veneer made by the application of plastic rubber or gutta-percha, colored in any desired manner, to one surface of cloth, and the subsequent vulcanization of the gum, as specified.

The above specification of my said invention signed and witnessed at Prairie du Chien this 20th day of March, A. D. 1871.

BENJM. D. STEVENS, D. D. S.

Witnesses:
 N. McCARTNEY,
 H. GILMORE.